Figure 1:
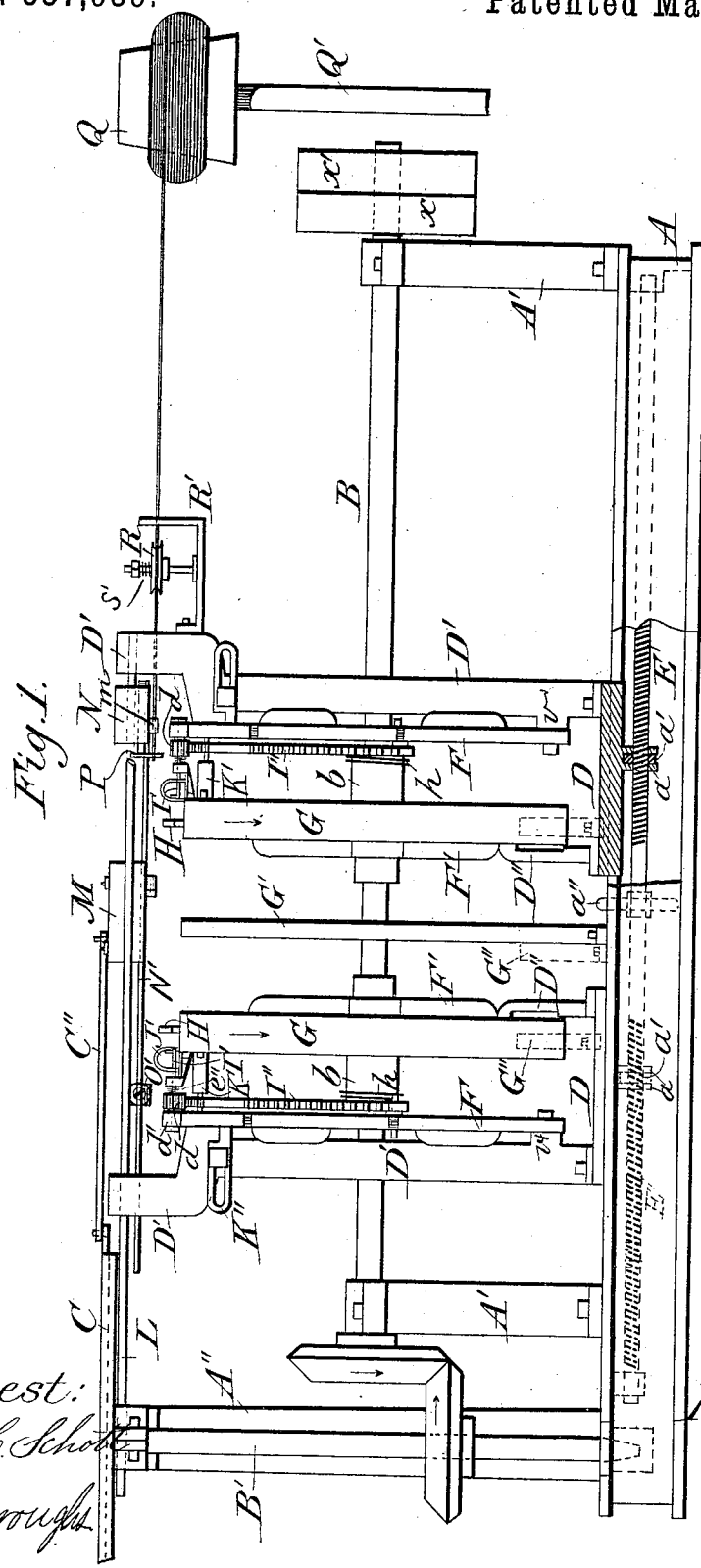

(No Model.) 8 Sheets—Sheet 1.

D. I. ECKERSON.
MACHINE FOR MAKING WIRE BALE TIES.

No. 337,939. Patented Mar. 16, 1886.

Attest:
F. H. Schott
G. Burroughs

Inventor:
D. I. Eckerson (No Model.) 8 Sheets—Sheet 2.

D. I. ECKERSON.
MACHINE FOR MAKING WIRE BALE TIES.

No. 337,939. Patented Mar. 16, 1886.

Attest:
F. H. Schott
G. Burroughs.

Inventor:
D. I. Eckerson (No Model.) 8 Sheets—Sheet 3.
D. I. ECKERSON.
MACHINE FOR MAKING WIRE BALE TIES.
No. 337,939. Patented Mar. 16, 1886.
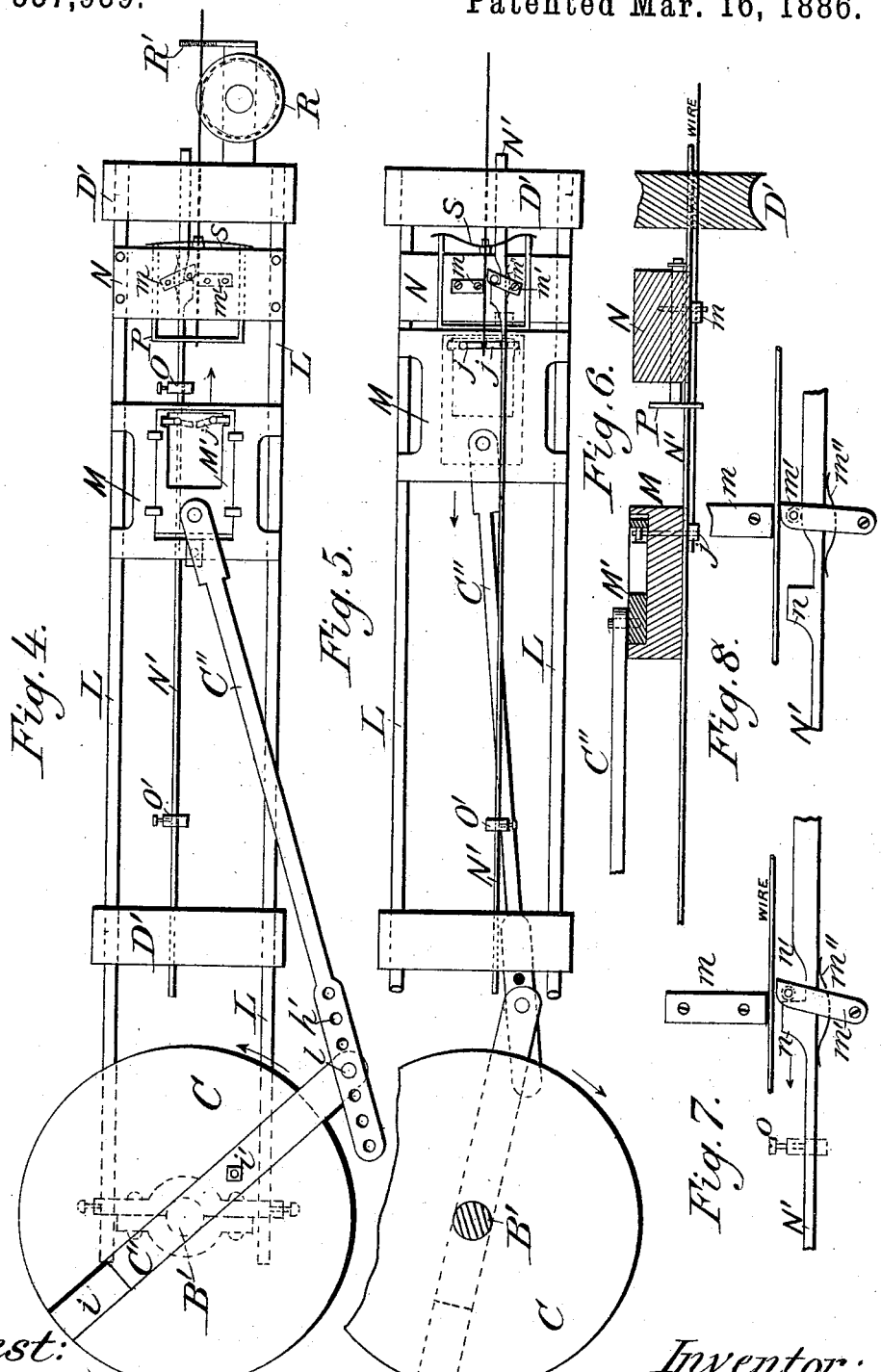

(No Model.)   8 Sheets—Sheet 4.
D. I. ECKERSON.
MACHINE FOR MAKING WIRE BALE TIES.
No. 337,939.   Patented Mar. 16, 1886.

Attest:
F. H. Schott
E. W. Burroughs

Inventor:
D. I. Eckerson

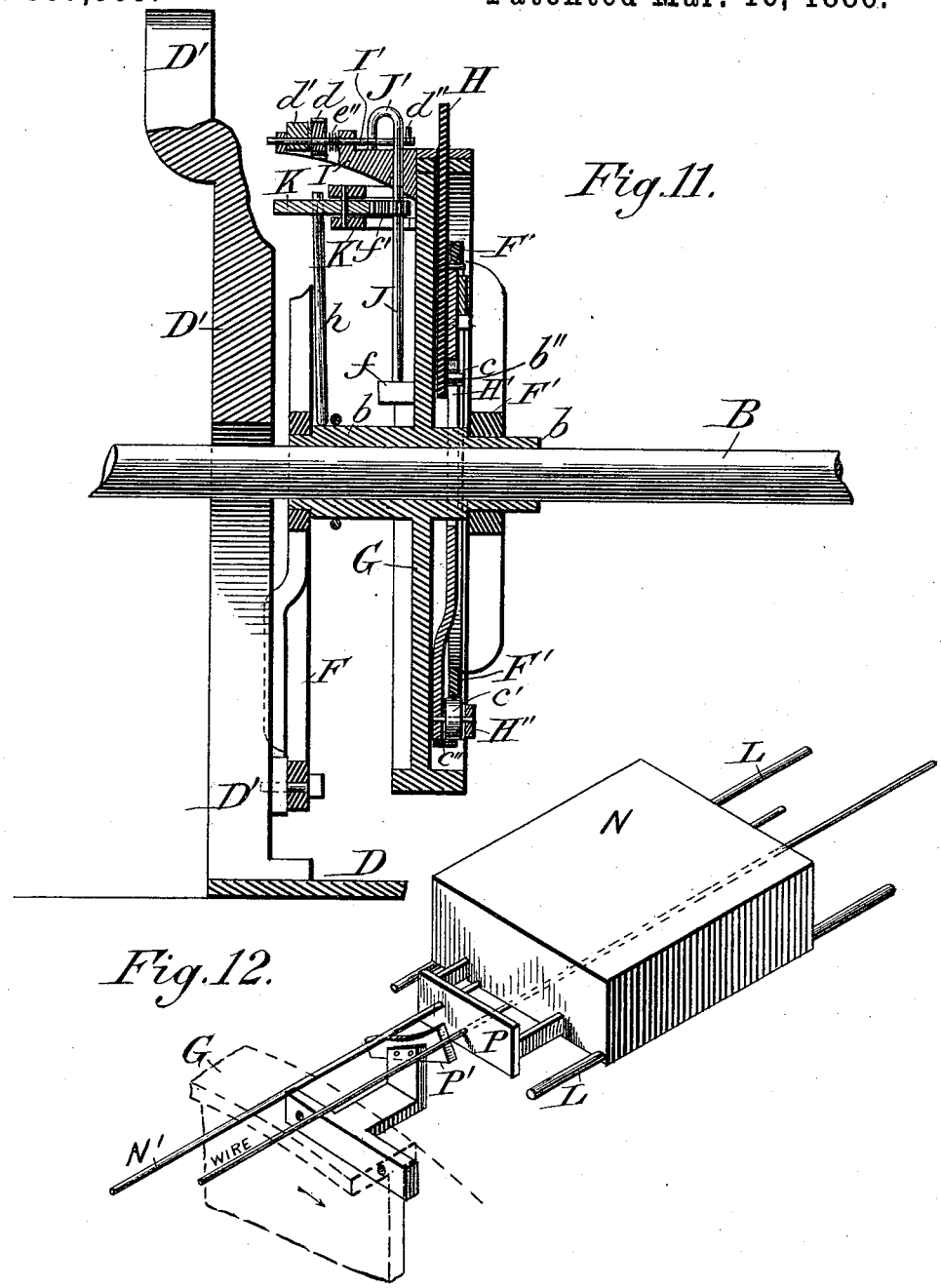

(No Model.) 8 Sheets—Sheet 6.

D. I. ECKERSON.
MACHINE FOR MAKING WIRE BALE TIES.

No. 337,939. Patented Mar. 16, 1886.

Attest:
F. H. Schott
J. Burroughs

Inventor:
D. I. Eckerson (No Model.) 8 Sheets—Sheet 7.
D. I. ECKERSON.
MACHINE FOR MAKING WIRE BALE TIES.
No. 337,939. Patented Mar. 16, 1886.
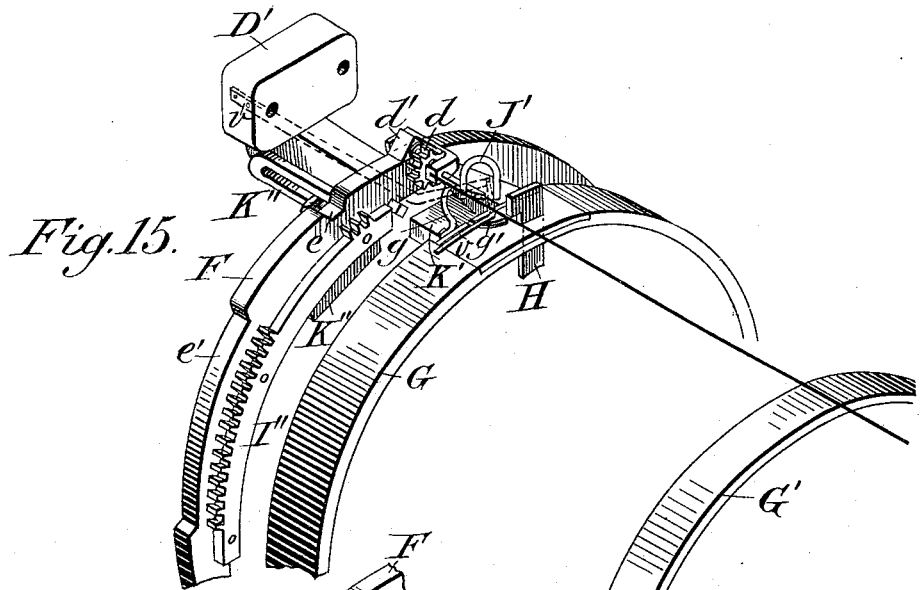
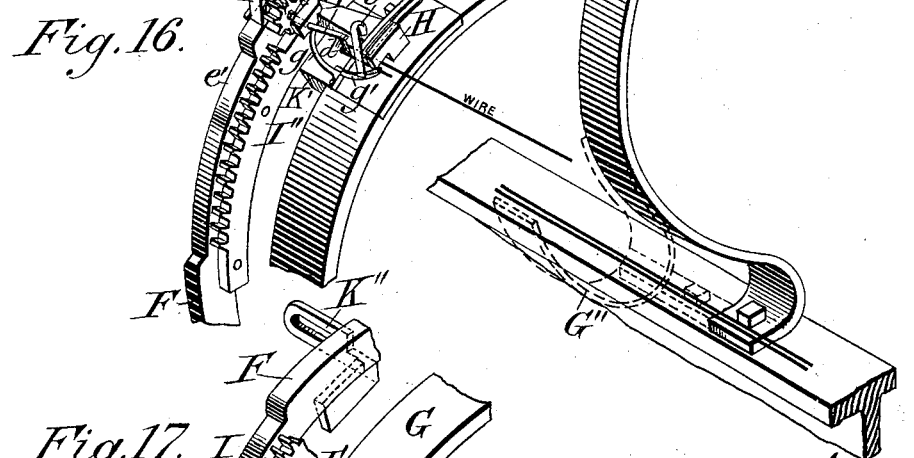
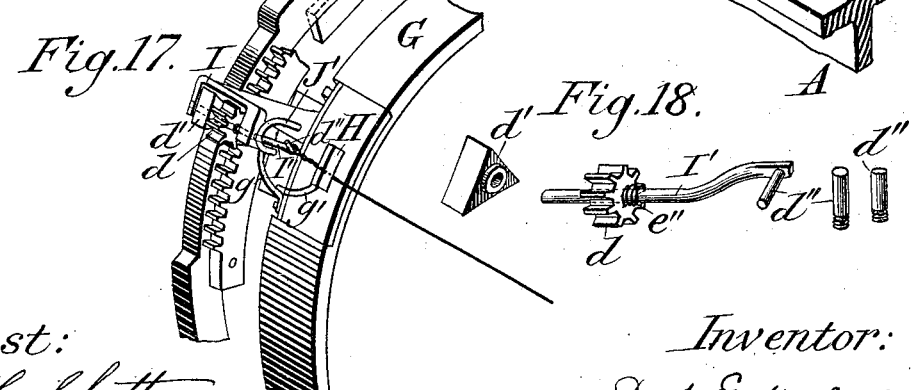
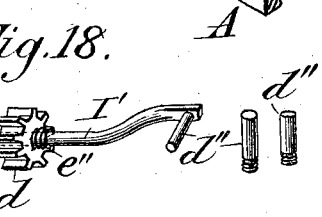
Attest:
F. H. Schott
G. Burroughs
Inventor:
D. I. Eckerson (No Model.) 8 Sheets—Sheet 8.

D. I. ECKERSON.

MACHINE FOR MAKING WIRE BALE TIES.

No. 337,939. Patented Mar. 16, 1886.

Attest:
F. H. Schott
G. H. Burroughs

Inventor:
D. I. Eckerson

UNITED STATES PATENT OFFICE.

DAVID I. ECKERSON, OF WORCESTER, NEW YORK, ASSIGNOR OF ONE-HALF TO ABRAM DIEFENDORF, OF SAME PLACE.

MACHINE FOR MAKING WIRE BALE-TIES.

SPECIFICATION forming part of Letters Patent No. 337,939, dated March 16, 1886.

Application filed December 31, 1885. Serial No. 187,201. (No model.)

*To all whom it may concern:*

Be it known that I, DAVID I. ECKERSON, a citizen of the United States, residing at Worcester, in the county of Otsego and State of New York, have invented certain new and useful Improvements in Machines for Making Wire Bale-Ties; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in that class of wire-working machines employed in making bale-ties and like articles of wire having a loop formed at one or both ends. Heretofore these machines have only been capable of performing a part of the many operations needed to convert the wire as it comes from the coil into a finished tie. For instance, the wire would be drawn from the coil and straightened by one machine, another would cut it into proper lengths, (or this operation would be performed by hand,) a third machine would bend the loops in the ends of the wire, and a fourth would be employed to secure these loops by giving to the wire a suitable twist at the point needed, to secure the loose end to the body of the wire between the loops. Each of these machines required an attendant, causing the bale-tie to pass through many hands before it was turned out a finished article, thus causing the manufacture of such wire bale-ties to become a comparatively costly process.

To obviate these defects, and produce a machine that shall be capable of performing all these various operations with the attention of but a single person, is the object of this invention, which consists in the construction and arrangement of devices by means of which the several operations of taking the wire from the coil, straightening and stretching the same, cutting it into proper lengths, bending the ends of the wire to form the loops, and then twisting these ends with the body in order to secure them, are all performed automatically by a single machine, as will be hereinafter fully explained, and the novel points and combinations stated in the claims.

Figure 2:
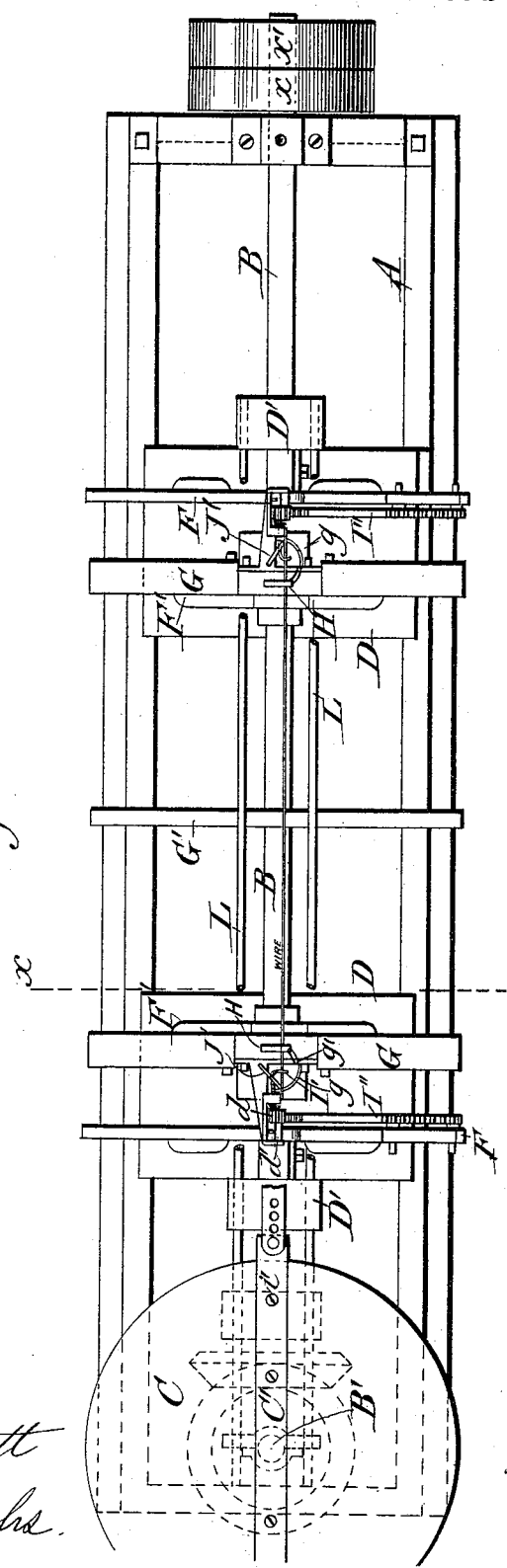
Figure 3:
Figure 9:
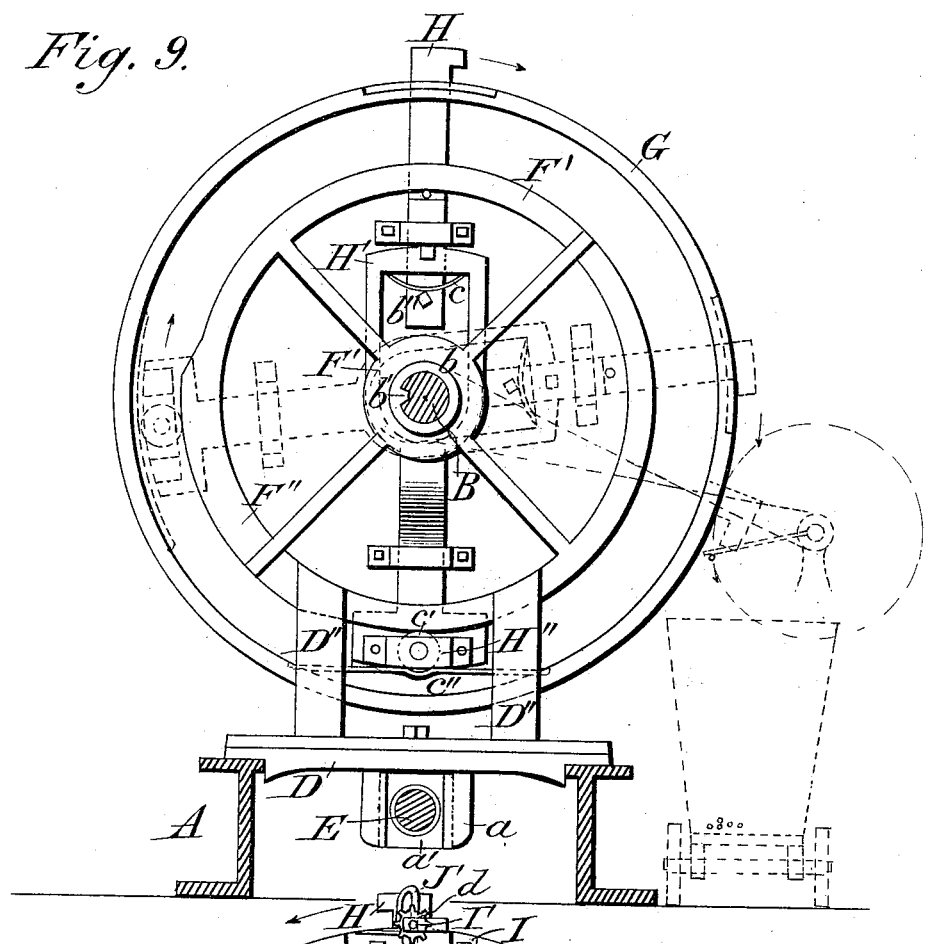
Figure 10:
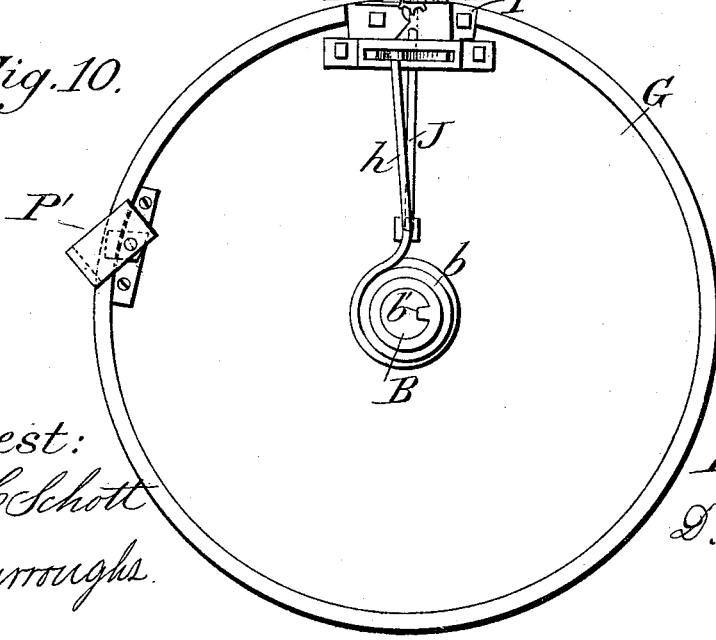
Figure 13:
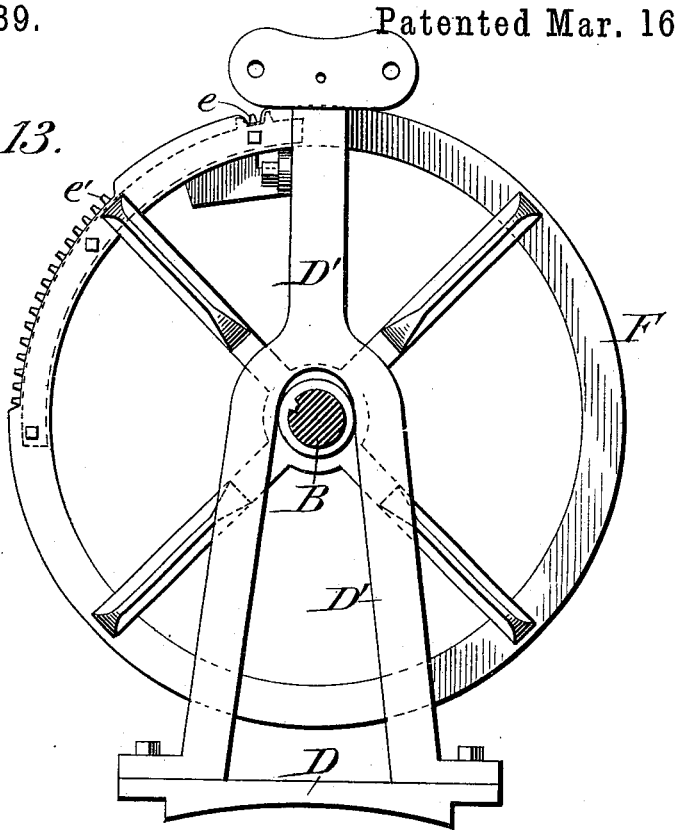
Figure 14:
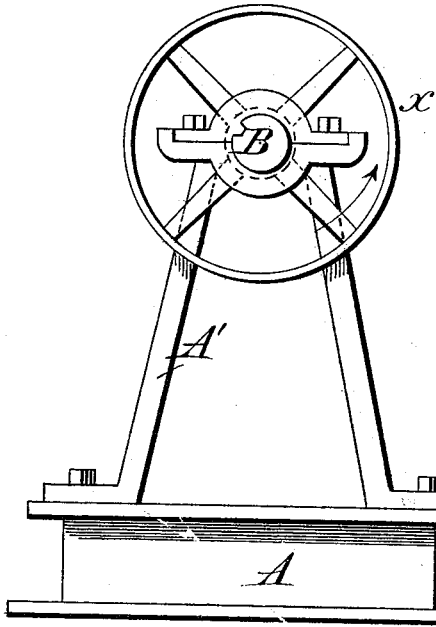
Figure 19:
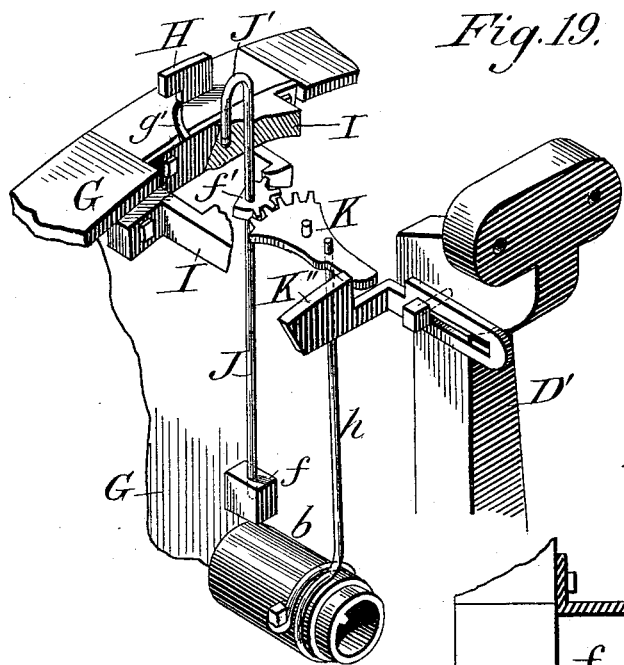
Figure 20:
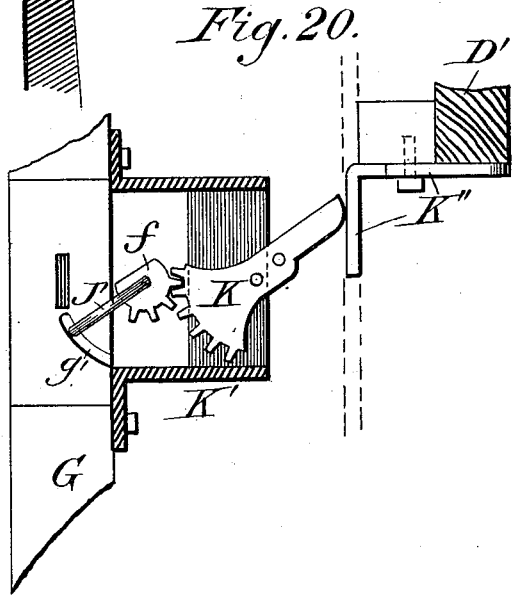
Figure 21:
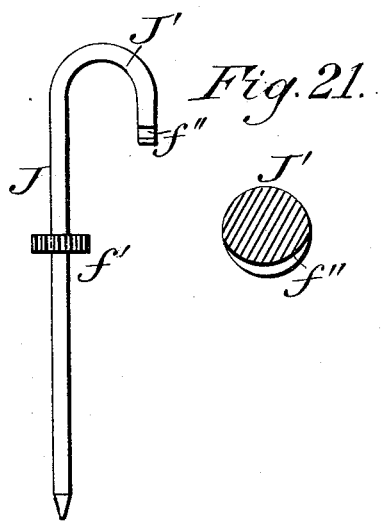
Figure 22:
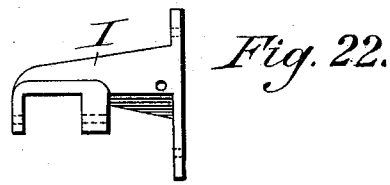

In the accompanying drawings, Figure 1 is a side elevation showing the arrangement of the stretching and straightening devices with relation to the loop forming and twisting mechanism. Fig. 2 is a plan of the same, the connecting-rod which operates the stretching device and other parts being broken away to show clearly the devices beneath. Fig. 3 shows the finished bale-tie, and also the same after the ends have been bent to form the loop before the parts are united by twisting. Figs. 4 and 5 show, respectively, a top and bottom plan of the stretching and straightening mechanism. Fig. 6 is a longitudinal section through the same. Figs. 7 and 8 are detail views illustrating the construction of the gripping devices which hold the wire from which the tie is formed during the operation of stretching the same. Fig. 9 is a transverse section through the machine on the line $x\,x$ of Fig. 2. Fig. 10 is a side view of one of the carrying wheels or disks. Fig. 11 is a vertical section through one of the carrying-wheels and adjacent parts. Fig. 12 is a perspective view of mechanism used for cutting the wire to the proper length after it has been drawn from the coil and stretched. Fig. 13 is a side view of one of the supporting-frames, the bed-plate upon which it is carried, and the plate which carries the segment-gears. Fig. 14 is an end view of the bed, one of the pedestals, and the shaft and pulleys supported by said pedestal, which give motion to the moving parts of the machine. Fig. 15 is a perspective view of a part of one of the carrying-wheels, the gear, its carrying-plate, the turning-hook, the wire from which a tie is made, and a central support for said wire in the position the parts occupy before the loop is formed. Fig. 16 is a similar view showing the position of the parts with relation to each other after the loop has been formed. Fig. 17 represents the parts in the act of twisting the loop to secure the bent end of the wire to the body of the tie. Fig. 18 shows detail views in perspective of the loop forming-pin and the spindle or shaft to which it is attached. Fig. 19 is a perspective view of a portion of one of the carrying-wheels, the turning-hook, and mechanism by which it is operated. Fig. 20 is a sectional plan of the turning-hook and its operating mechanism. Fig. 21 is a side view of the turning-hook and a greatly-enlarged section of the same near the extremity of the hook, showing the notch which catches the wire during the operation of bending it to form the loop. Fig. 22 is a plan or top view of the bracket attached to a carrying-wheel, and supporting one end of the shaft of the turning-hook, also the shaft carrying the loop formed.

In constructing this machine a suitable bed, A, is provided, which is preferably constructed of metal, and is of sufficient length to carry the various devices employed in straightening, stretching, looping, and twisting the wire from which the bale tie is formed. Securely bolted or otherwise attached to this bed are the pedestals A' A', carrying in suitable journal-bearings the shaft B. This shaft receives motion from any desired motor having sufficient power to operate it, and is the means by which all the various mechanisms of the machine are operated. This motion is communicated from the motor to the shaft by a belt running upon the pulleys $x$ $x'$, attached to the end of the shaft, one of which, $x'$, is loose and revolves upon the shaft, the other, $x$, being fixed thereto. By this arrangement, when it is desired to stop the machine the belt is run upon the loose pulley, and when it is to be started said belt is transferred by any suitable shifting mechanism to the fixed pulley. Upon the opposite end of this shaft B from the pulleys by which it is driven is fixed a miter gear-wheel, which engages with a similar gear-wheel upon the vertical shaft B', which shaft rests at its lower end in a step formed in or attached to the bed A, its upper end revolving in and being supported by a journal-bearing carried by the support or pedestal A''. This vertical shaft carries upon its upper end a crank-plate, C, from which the stretching devices are operated, as will be hereinafter fully set forth.

Sliding upon suitable ways formed on the bed A are the bed-plates D D, each of which carries a portion of the looping and twisting mechanism.

As the machine is designed to form bale-ties of various lengths, it becomes necessary to provide means for adjusting this mechanism to the length of tie to be formed. In order to accomplish this, each of the bed-plates D is provided on its under side with a bifurcated downward projection, $a$, which clasps and holds a nut, $a'$. One of these nuts is provided with a right and the other with a left screw-thread, and passing through them is the similarly-threaded screw-shaft E, supported at each end in bearings attached to the bed A. A hand-wheel, $a''$, is secured upon the shaft E, by means of which said shaft is rotated, thus causing the bed-plates D and the looping and twisting mechanism carried by them to be brought closer together or forced apart. It is evident that the adjustment of these bed-plates could be accomplished by other means; or, if the machine was designed to manufacture certain specific lengths of bale-ties, holes might be bored in the bed and bed-plates at proper points to suit the different lengths, and the two securely bolted together at either of those points.

Firmly secured by bolts to the bed-plates D, and projecting vertically therefrom, are the supporting frames or standards D' D'. To one side of each of these frames, upon slightly-projecting studs $v'$, is secured a gear-plate, F, and connected with the central hub carried by the gear-plate, but revolving loosely therein, is the elongated sleeve $b$ of each of the carrying disks or wheels G G, which are supported by the shaft B, and caused to revolve therewith by means of the keys $b'$, which enter a spline or keyway formed for their reception in said shaft, and of such length as to allow the carrying-wheels and accompanying mechanism to be adjusted to any point required by the length of the tie to be formed. These carrying-wheels G are provided with a hub or sleeve, $b$, extending from the disks or spokes of the wheels in both directions, one of these extensions, as before stated, revolving in the hub of gear-plate F and the other in the hub of cam-plate F' which is supported upon the bed-plates D by the standard D''. The wheels G also carry the mechanism by which the loops are formed and the wire twisted. In order to perform these operations upon the wire, it is necessary that it shall be held firmly at each end in contact with or adjacent to the periphery of each wheel. This is accomplished by means of a sliding jaw or clamp, which has a radial sliding movement across the wheel, and is constructed in two parts, H and H'. The part H forms the clamp proper, and is provided with a laterally-projecting jaw, which, when said part is drawn toward the center of the wheel, catches the wire between the periphery of the wheel and the clamping-jaw, holding the same firmly. The part H' of this clamping mechanism is provided with an opening, through which the shaft B passes, and also carries within the opening a spring, $c$, which acts upon the pin $b''$ of the clamp, tending to draw it toward the center of the wheel. The opposite end of the part H' carries a cross-bar or T-head, H'', within a suitable recess, in which is placed the friction wheel or roller $c'$, which runs in contact with the periphery of cam-plate F'. As the wheels G revolve in the direction of the arrow, (see Fig. 9,) it is evident that as the clamping-jaw approaches the highest point the roller $c'$ will strike the plate-spring $c''$, and the whole clamping device will be forced upward sufficiently to permit the wire to enter between the jaw and periphery of the wheel G, and that as this wheel continues to revolve the roller will pass off the spring $c''$, allowing the jaw, after the loop has been formed, to be brought firmly down upon the wire by the enlarged portion F''' of the cam-plate and the spring c, in which position it remains until the ends of said wire have been looped and twisted, when the roller, having reached the end of the enlarged part of the cam-plate, allows the jaw to move outward, releasing the wire and allowing it to fall into the hooks G'', Fig. 13, or other suitable receptacle attached to the supporting band or bands G', placed upon the bed A between the bed-plates D, to prevent the sagging or bending downward of the wires between the carrying-wheels.

The loop forming and twisting mechanism is constructed as follows: To each of the carrying-wheels G is firmly secured a bracket, I, which projects outward over the gear-plate F. This bracket is provided with journal-boxes, which receive the journals of the twisting-shaft I'. This shaft carries a pinion, d, by which it is rotated while twisting the looped wire, and a triangular block or cam, d', which rides on the periphery of the gear-plate F, preventing the shaft I' from turning, except when said cam is in one of the recesses e or e', formed in said periphery. In passing into these recesses it is partially rotated, forming a guide for the teeth of the pinion d, causing them to properly engage with the toothed segment I'', secured to the gear-plate. The shaft I' is further provided with a screw-threaded loop-forming pin, d'', which is screwed into a suitably-threaded orifice in the inner end of the shaft, said shaft being bent near this end, so as to be thrown entirely outside of its axial line at the point where the loop-pin is inserted, in order that the wire to be twisted may occupy that line.

The object of making the looping-pins detachable from the twisting-shaft is that pins of different sizes may be used to suit the wire or to form the loops larger or smaller, as desired.

It will be observed that the gear-segment I'' has but three teeth opposite the recess e in the gear-plate, the object of which is to always bring the loop-forming pin into a radial position, its extremity pointing radially outward until it receives the wire, when it changes its position and points downward or toward the center of the disk, and remains so while the loop is being formed, which act is accomplished while the triangular cam is passing from the recess e to the recess e'. Upon reaching this point the above-named cam is again released, allowing the pinions to engage with the series of teeth on the segment I'', opposite this recess. By the action of these teeth the shaft I' is revolved, and the loop of wire passing around the pin d'' is twisted. As the wire is slightly shortened by the act of twisting, it becomes necessary to provide means for relieving the strain produced thereby on the forming-pins. This is accomplished by placing a coiled spring, e'', around the shaft I', between the pinion and one of its bearings in the bracket I. As the shaft has no collars to its journals, the pinion d is carried against this spring, which gives sufficiently to relieve the strain.

In order to form the loop, a spindle or shaft, J, having one end stepped in the bearing f, attached to the wheel G, extends radially outward, its outer bearing being formed in the bracket I. The outer or free end of this spindle J is bent into a U-shaped hook, J', (see Fig. 21,) and provided with a notch, f''', which as the spindle is revolved catches the wire and bends it around the pin d'', (see Fig. 16,) a guard attached to the bracket and rim of the wheel, as well as a recess, g', formed in the latter, serving to guide the wire as well as the end of the hook. In order to give the desired movement to this hook, a pinion, f', is secured upon the shaft J, with which gears the sector-lever k, fulcrumed in the case K', secured to the wheel G beneath the bracket I.

Adjustably secured to the support D' is a stop, K'', which may be moved into the path of the outer end of the sector-lever, so that as the latter is carried forward by the wheel G said end will engage with the stop, causing the opposite end to partially rotate the spindle J and carry the hook J' around the forming-pin.

It will be observed that the slot in stop K'' allows its adjustment to a greater or less distance into the path of the lever, so that the latter may be made to turn the spindle J through any part of a circle that may be desired.

In order to return the spindle and its loop-forming hook to their normal position after the action of the stop has ceased, a spring, h, is secured to the sleeve b of the carrying-wheel, its outer end passing through a hole in the lever K, and tending to throw back said lever, and retain the hook in such position as to leave the clamp and forming-pin ready to receive the wire.

An additional device consisting of an arm, v, may be attached to the upper part of the standards D', said arm being provided with an elastic extremity, which causes the wire to remain in contact with the periphery of the carrying-wheels until it is so secured by the clamp H.

In order to supply, stretch, and cut the wire to the proper length, I employ the following mechanisms: The crank-plate C, carried by the shaft B', is provided in its top with a transverse recess, i, in which slides the plate C', adjustably secured in said slot by the set-screw i'. This plate C carries at one end a crank-pin, l, to which the connecting rod C'' is attached.

It will be seen that by means of the sliding plate which carries the crank-pin, the latter may be adjusted at any distance radially from the axis required to make the throw of the crank equal to the length of the wires needed to form the bale-ties, and that by means of the series of perforations h' in the connecting-rod, through which the crank-pin passes, the rod may be adjusted to meet such changes in length of crank.

Passing through orifices in the upper part of the supports D' D' are guide-rods L L, extending nearly the whole length of the machine and carrying the sliding cross-head M. A second slide, M', has a limited movement in suitable guides within an elongated opening in the cross-head M, and pivoted to this slide M' is the connecting-rod C". It is evident from this construction that when the slide M' reaches the ends of the recess in which it moves it will carry the cross-head with it, and the movement of this cross-head, determined by the stroke of the crank, regulates the length of wire to be used in making a single bale-tie. Pivoted to the cross-head are two jaws, j j, the outer ends of which rest in notches in the slide M', and so arranged that when the cross-head is moving toward the crank the jaws will be closed, grasping firmly the wire between them; but when the movement of the cross-head is reversed and it moves from the crank the action of the slide opens the jaws and releases the wire.

Attached to the guide-bars L L, near one end of the same, is a cross-piece, N, upon which is secured the fixed jaw m and pivoted jaw m'. This pivoted jaw is provided with a friction-roller, between which and a spring, m", passes the cam-rod N'. This cam-rod is provided with a recess and two projections, n and n', upon opposite sides of said recess, the projection n being abrupt, so that when it strikes the roller attached to the jaw m' the latter is at once moved backward, so as to release the wire that is held between it and the jaw m, as shown in Fig. 7 of the drawings. The projection n', however, has an easy incline, which, after reaching its limit of extension, is continued for some distance along the rod, so that when it strikes the roller the jaw m is gradually brought into contact with the wire, holding it firmly against the opposite jaw and preventing any slipping of the same during the operation of stretching. (See Fig. 8.) Motion is given to the cam-rod N' by means of the adjustable stops o and o', secured upon the rod in such positions as to be struck by the cross-head M at each end of its reciprocation, the position of the stops with relation to the extreme movement of said cross-head determining the time during which the wire is held by the jaws. A plate, P, perforated to allow the passage of the wire through the same, is provided with arms, which extend through the cross-piece N, having a sliding movement therein, and are connected on the opposite side of the cross-piece to a spring, s. The tendency of this spring is to force the plate away from the face of the cross-piece, and to retain it in that position, except when it is forced back by being struck by the cross-head in the act of catching the end of the wire, as will be hereinafter explained. This plate P also acts as a support for the wire against the action of the cutting-blade P', secured in a proper position to the periphery of one of the wheels G. (See Fig. 12.)

The wire from which the bale-ties are to be formed is preferably carried upon the cone or reel Q, mounted upon a suitable vertical support, Q', and passes thence around the grooved tension-pulley R, carried upon the bracket R', attached to one of the standards D'. This tension-pulley is prevented from revolving any faster than the wire is drawn into the machine by a spring, s', which is held in contact with one side of the pulley by an adjusting-screw, and prevents a too free revolution of the same.

The operation of the machine is as follows: A coil of wire having been placed upon the reel, its end is carried through an orifice in an upwardly-projecting arm of the bracket R', around the tension-pulley, and through orifices in the head of one of the standards D', the cross-piece N, and plate P. The effect of passing the wire through these numerous orifices is to straighten out all small bends and prepare it for the stretching process which succeeds. The machine being now put in motion by a belt upon the driving-pulley, the crank-plate is caused to revolve, carrying with it the crank and giving to the cross-head a reciprocating movement. As this cross-head moves away from the crank, the action of the slide M' opens the jaws j j, and as the cross-head strikes the plate P said plate is pushed back, allowing the wire to project between the jaws. Simultaneously with this action the cross-head strikes the stop o upon the cam-rod, causing the projection n upon the latter to push back the jaw m', releasing the wire from its grasp. As the cross-head commences its return-stroke toward the crank, the jaws j j seize the end of the wire, drawing it forward. When the end of the stroke in this direction is nearly reached, the cross-head strikes the stop o' on the cam-rod, bringing the cam n' on the same into action upon the jaw m', causing the wire to be seized and firmly held between said jaw and the jaw m. As the movement of the cross-head continues in the same direction, and the jaw m' is caused to maintain its grasp firmly by the elongation of the projection n' on the cam-rod, it is evident that the wire will be stretched as much as the cross-head moves in the same direction after the seizure of the wire by the jaws m m', this distance being regulated by the position of the stop o' upon the cam-rod. This stretching is found necessary, in order to remove all kinks and bends from the wire and take away all tendency to spring into the coiled form it has when upon the reel before entering the machine. As the continued movement of the crank reverses that of the cross-head, and it begins to travel in the opposite direction, the reversed movement of the slide M releases the jaws j j, allowing that end of the wire to drop on one of the carrying-wheels. Simultaneously with this the cutter P' comes into action and cuts the wire against the plate P, thus allowing both ends to drop upon the carrying-wheels, where it is seized by the clamps H H and carried forward until the sector-levers K, carried by the wheels G, strike the stops K'', which causes the loop-forming hooks J' to revolve and bend the ends of the wire around the pins d'', which have been placed in position to receive said wire by the action of the recesses e upon the triangular blocks d' and teeth of the gear-plates upon the shaft I' and their connections. After forming the loops the loop-forming hooks are returned to their normal position by the springs h, the carrying-wheels move forward and bring the pinions upon the shafts I' into engagement with the teeth of the gear-plates opposite the recesses e'. These teeth, acting upon the pinions, revolve their connected shafts, causing the loops to be twisted, and firmly uniting the ends of the wire with the body of the same between the loop-forming pins. As the carrying-wheels continue their rotation, the pinions pass out of engagement with the teeth of the gear-plates, the shafts I' cease their revolutions, the clamps H release their hold upon the wire, and the finished bale-tie is allowed to drop into the receptacle prepared for its reception.

It will be seen that by the continued revolution of the driving-shaft the above-described series of operations will be repeated, and the manufacture of bale-ties go on automatically so long as the material for their manufacture is supplied.

It is evident that many changes may be made in the details of this machine without departing from the general arrangement of parts—as an instance, in place of the curved arms attached to the wire-supports to form a receptacle for the finished bale-ties a removable receptacle may be used, and devices may be employed to forcibly detach the ties from the loop-forming hooks and deposit them in the receptacle, as indicated in dotted lines in Fig. 9, which addition would allow the machine to be run at greater speed, as it would not be dependent upon the action of gravity alone for their removal; and, further, the machine may be easily adapted to forming loops upon only one end of the tie or looping-wires, to be used for other purpose than as bale-ties.

Having thus described my invention, I claim as new and desire to secure by Letters Patent of the United States the following:

1. In a machine for making wire bale-ties, the combination, with a wire straightening and stretching mechanism and a cutting-off device, of the mechanism for automatically forming loops on each end of the wire and means for operating the several mechanisms in due order, as set forth.

2. In a machine for making bale-ties, the combination, with a bed and suitable journal-supports mounted thereon, of a driving-shaft and carrying wheels or disks rotating with and adjustable on said shaft, and devices for looping and twisting the wires carried by the wheels or disks, substantially as and for the purpose set forth.

3. In a bale-tie machine, the two movable bed-plates supporting the carrying-wheels and loop forming and twisting mechanism carried by the wheels, in combination with the non-rotating cam and gear plates supported by said bed-plates and an adjusting-screw for moving the bed-plate, in the manner and for the purpose set forth.

4. In a wire bale-tie machine, the rotating disks or carrying-wheels provided with diametrically-sliding clamps and carrying-spindles provided at their outer ends with a loop-forming hook, in combination with a shaft revolving in suitable bearings and carrying a forming-pin at one end and the non-rotating cam and gear plates provided with suitable teeth and projections to give the desired movement to the several parts, as set forth.

5. The combination of the bed-plate, the rotating disks or carrying-wheels, and the central supporting band or bands secured to said bed-plate, to prevent the sagging of the wires between the wheels, as set forth.

6. The combination, with the rotating carrying-wheels G G and supporting-bands G', of the curved extensions G'', attached to or integral with said bands and forming a receptacle for the finished bale-ties, as specified.

7. In a bale-tie machine, a carrying-wheel provided with a clamp formed of two parts, H and H', elastically connected, in combination with the cam-plate F and spring c'', arranged to operate said clamp as the wheel rotates, for the purpose specified.

8. In a bale-tie machine, the carrying-wheel provided with bracket I and loop-forming spindle and hook, in combination with pinion f', sector-lever K, and adjustable stop K'', arranged and operating to form the loops in the ends of the wire, as set forth.

9. The combination, in a bale-tie machine, of the loop-forming hook, the pinion f', and spindle J, sector-lever K, and spring h, said spring acting to return the parts to their normal position after displacement by the stop K'', as specified.

10. In a bale-tie machine, the combination of loop-forming hook J', provided with notch f''', with the curved guide g and recess g', arranged to catch and carry the wire around a forming-pin, as set forth.

11. In a bale-tie machine, the combination of the rotating loop-forming hook with the shaft I', its pinion, the triangular guide-block, the gear-plate and connected toothed segment, arranged as set forth, to form and twist the loop.

12. In a bale-tie machine, the shaft I', having one end thrown out of the axial line, in combination with the removable loop-forming pin, as set forth.

13. In a bale-tie machine, a wheel, G, bracket I, shaft I', carried by said bracket and provided with removable pin d'', spring e'', pinion $d$, and triangular block $d'$, in combination with the gear-plate and toothed segments, for imparting motion to said shaft, as set forth.

14. In a bale-tie machine, the combination of the vertical shaft B′, crank-plate C, having recess $i$, with adjustable slide C′, carrying the crank-pin, and set-screws $i'$ for securing said slide, with cross-head M, cam-rod N′, having adjustable stops $o\ o'$, cross-piece N, and holding-jaws $m\ m'$, for the purpose set forth.

15. In a bale-tie machine, the adjustable crank and adjustable connecting-rod, in combination with the cross-head M and slide M′, for opening and closing the jaws $j\ j$ in the operation of drawing and stretching the wire, arranged to have a limited movement within the slide M, as set forth.

16. In a bale-tie machine, the combination, with the reciprocating cross-head M and slide M′, having a limited movement in said cross-head, of the jaws $j\ j$, pivoted to the cross-head and operated by the slide, in the manner set forth.

17. The combination, in a bale-tie machine, of the cross-piece N, stationary jaw $m$, and pivoted jaw $m'$, with the cam-rod N′, having stops $o\ o'$, and suitable projections, $n\ n'$, to operate the pivoted jaw, as specified.

18. The reciprocating cross-head carrying slide M, and provided with wire-grasping jaws operated by said slide, in combination with the jaws $m\ m'$, attached to cross-piece N, and cam-rod N′, having stops $o\ o'$, all arranged and operating to hold and stretch the wire, as set forth.

19. In a bale-tie machine, the combination of the spring-supported plate P with slide M, the cutter P′, and carrying-wheel G, as set forth.

20. In a bale-tie machine, the combination of the wire-supporting reel, tension-pulley, and standard D′, cross-piece N, having spring-supported plate P, and holding-jaws $m\ m'$, cam-rod N′, having adjustable stops $o\ o'$ and projections $n\ n'$, cross-head M, having grasping jaws $j\ j$, slide M′, and operating connecting-rod C″, for straightening and stretching the wire, substantially as shown and described.

In testimony whereof I affix my signature in presence of two witnesses.

DAVID I. ECKERSON.

Witnesses:
ABRAM DIEFENDORF,
H. A. HALL.